3,182,392
METHOD AND APPARATUS FOR EXPLOSIVELY BONDING A PLURALITY OF METAL LAMINAE TO URANIUM ALLOY
Jackson Neal, Baltimore, and Harry P. Kling, Glenarm, Md., assignors to Martin-Marietta Corporation, Baltimore, Md., a corporation of Maryland
Filed Jan. 19, 1962, Ser. No. 168,316
20 Claims. (Cl. 29—421)

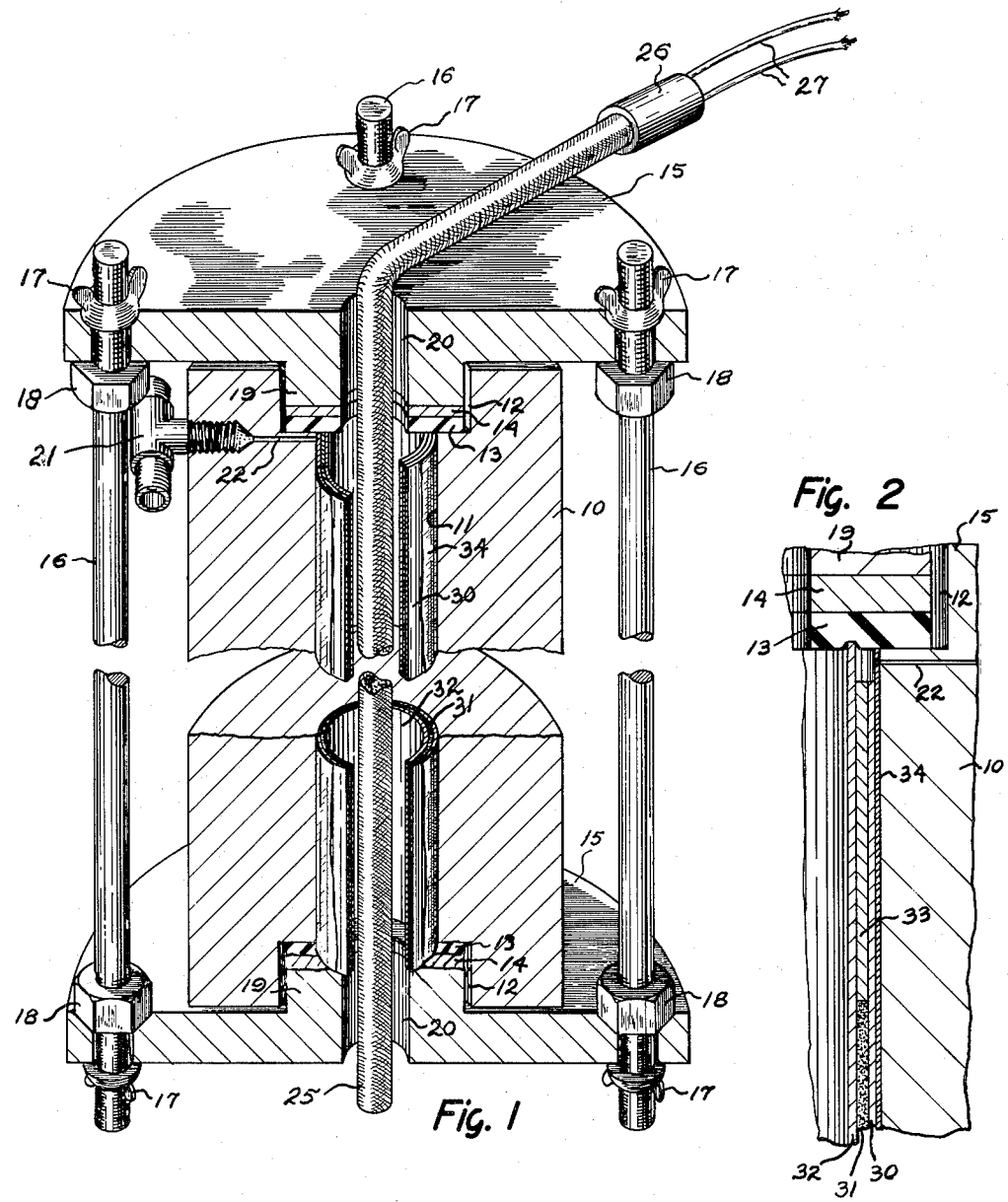

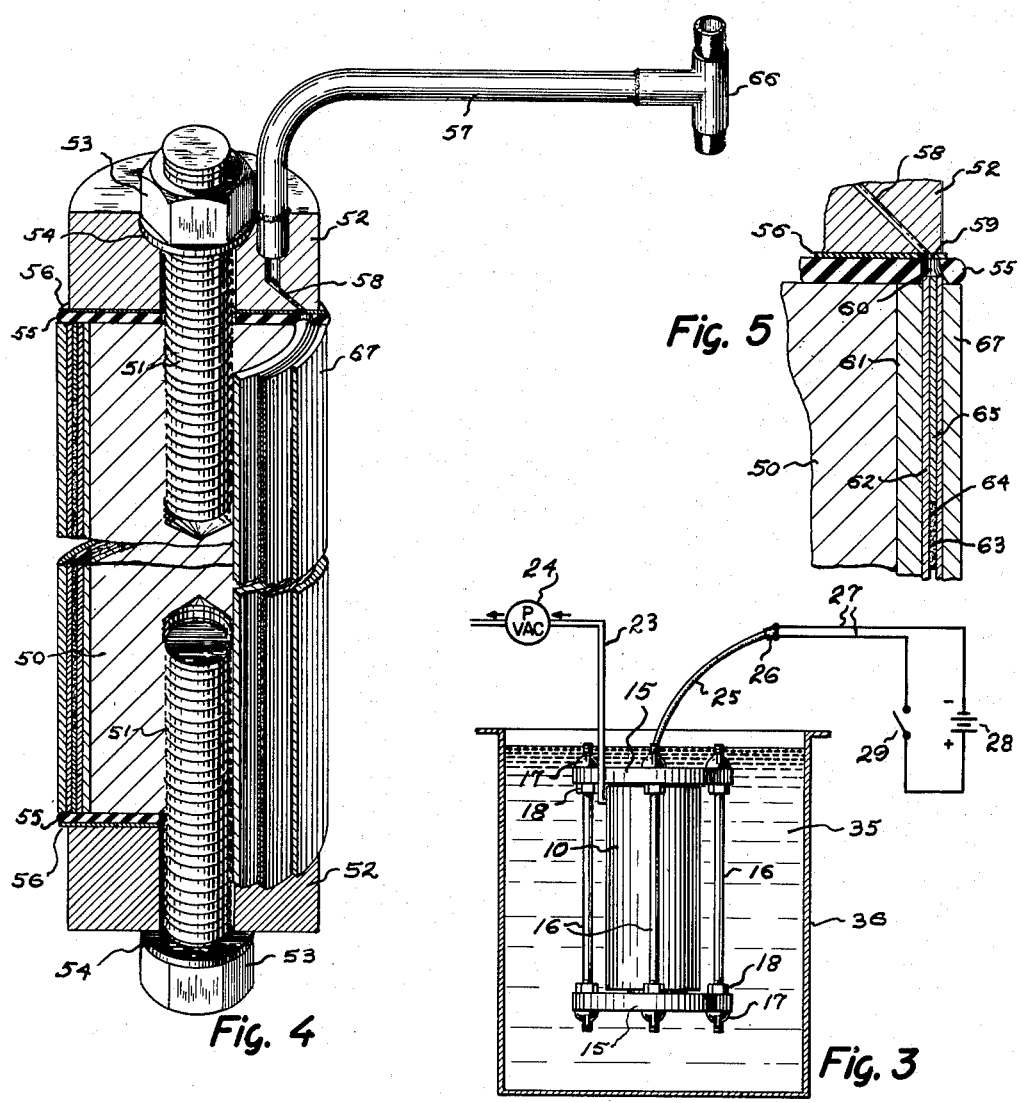

The present invention relates to a method and apparatus for bonding a plurality of metal laminae to uranium alloy.

Heretofore, tubular fuel elements have usually been constructed by conventional methods wherein flat plate elements are mechanically bent and assembled into a tube and welded. This has proved objectionable in that there are unfueled seams present in the tube which results in less than the desired amount of fuel being carried in the tube and presents a serious irregularity in the neutron flux distribution occurring at the seam. Some fuel elements have been formed by co-extrusion which does not permit uniform clad thickness and affects the reliability of the reactor. Others have been formed by swaging or bonding and thereafter effecting a diffusion bond by heat treating. This last method has been undesirable, particularly where it is necessary to employ large diameter fuel tubes, because such tubes have a tendency to slump apart instead of bonding when heated.

Generally, the present invention provides a method and apparatus of fabricating fuel tubes for nuclear reactors, and particularly relates to the bonding of the inner and outer cladding to a fuel bearing core material by explosive means. In one form of the invention, there is provided a female bonding die which includes a body having a centrally disposed cylindrical opening into which is fitted an outer cladding tube and an inner cladding tube with a tube of fuel bearing material interposed between the two cladding tubes. Novel means is utilized to apply vacuum to the assembled tubes to fully align them with the inner face of the bore of the die. A barrier material is wrapped around the outer clad tube prior to its insertion in the die to prevent the specimen material from bonding itself to the die wall. An explosive core is then positioned centrally and longitudinally in the die bore and the thus assembled tubes and the entire device is immersed in water. When the core is detonated, the hydraulic shock wave created by the explosion forces the three components together and makes a metallurgical bond. The process is unique in that fuel tubes of any size may be made, and many different combinations of materials may be used. Furthermore, the bonding may be accomplished without subjecting the mass of the fuel element to elevated temperatures to avoid softening or annealing effects and thereby eliminates any diffusion reaction between the several components.

In a modification of the invention, a male die includes a cylindrical body initially coated with a barrier material which is melted or dissolved at the completion of the process and over which is successively positioned an inner cladding tube, a tube of fuel bearing material and an outer cladding tube. Over the latter is wrapped a sheet explosive and the entire device is immersed in water and detonated.

It is, accordingly, a principal object of the invention to provide a novel method and apparatus for bonding inner and outer tubes of cladding material with a tubular core of fuel bearing material.

Another object of the invention is to provide a novel fuel tube for a nuclear reactor.

Still another object of the invention is to provide, in a method and apparatus of the character set forth, novel explosive means for bonding together a plurality of materials.

Still another object of the invention is the provision of a novel female die forming a part of the invention.

A further object of the invention is the provision of a novel male die forming a part of the invention.

Another object of the invention is the provision, in a method and apparatus of the character set forth, of the novel use of liquid immersion as a part of said method.

These and other objects will become apparent as the specification is considered with the accompanying drawings, wherein FIGURE 1 is a fragmentary perspective view of a die and associated apparatus utilized in carrying out the invention;

FIGURE 2 is an enlarged fragmentary sectional view of the device of FIGURE 1 illustrating certain details of assembly;

FIGURE 3 is a reduced elevational view of the device illustrated in FIGURE 1 showing the same immersed in a tank of water, the latter being shown in vertical section;

FIGURE 4 is a fragmentary perspective view illustrating another form of the invention; and FIGURE 5 is an enlarged fragmentary sectional view of the device of FIGURE 4 illustrating certain details of construction and assembly.

Referring more particularly to the drawings, wherein similar reference characters designate like parts throughout the several views, and specifically to the preferred form of the invention shown in FIGURES 1 to 3, a female bonding die includes an elongated cylindrical body 10, preferably of tool steel, and formed with a centrally disposed longitudinally extending bore 11. The internal diameter of the bore is ground to the desired size of the finished fuel tube which is the product of the present method. Provided centrally at each end of the body 10 is a cylindrical recess 12 within each of which there is first positioned an annular rubber gasket 13 with a metal washer 14 positioned thereover.

The opposing ends of the body 10 accommodate circular end caps 15 of substantially greater diameter than the die so as to project marginally therebeyond. A series of circumferentially spaced rods 16, projecting through spaced openings in the extended marginal edges of the caps 15 serve to interconnect the latter. The ends of the rods are threaded to receive wing nuts 17 which engage the outer faces of the caps and nuts 18 abutting the undersides of the caps so that the same are securely anchored in place on the die in an obvious manner.

A fitting 21 is threadably mounted in the side of the body 10 adjacent one end thereof and communicates with a passage 22 which extends radially to communicate, in turn, with the bore 11. The fitting interconnects with a tube 23 which, in turn, is connected to a source of vacuum, such as pump 24, for a purpose to be hereinafter set forth.

An explosive cord 25 is centrally extended through the openings 20 in the end caps 15 and the interior of the bore 11 and is provided at one end with a detonator 26 electrically connected by wires 27 to a source of electrical energy indicated at 28, one of the wires 27 being provided with a switch 29.

In carrying out the method of this preferred form of the invention, the components of the fuel tube to be bonded by the method are first assembled one within another in the following manner: an outer cladding tube 30, a foreshortened tube or cylinder 31 of fuel and an inner cladding tube or cylinder 32. The tubes 30 and 32 may be formed, for example, of aluminum and the fuel tube 31 may be, by way of example only, a uranium alloy.

The tube 31 may be of identical length with the tube 30 but, preferably, is foreshortened to allow the insertion between the assembled inner and outer cladding tubes 30 and 32 of cylindrical inserts 33 in each end portion of the assembly, the inserts being, for example, likewise of aluminum.

It will be noted that the over-all length of the outer cladding tube 30 and the fuel tube 31 and its associated members 33 is slightly less than (preferably one-eighth inch) the length of the body 10 measured from the inner faces of the recesses 12, as indicated in FIGURE 2. It will also be apparent that the length of the body 10 measured between the inner faces of the recesses 12, as indicated in FIGURE 2, such excess length being in the nature of one-thirty-second of an inch.

Before the cladding and fuel bearing tubes 30–32 are assembled, they are chemically or otherwise cleaned to remove any surface films or contamination. The outside of the thus assembled fuel tube is covered with a suitable barrier material 34, such as a polyester film formed by condensation reaction between ethylene glycol and terephthalic acid, the film being available commercially from E. I. du Pont de Nemours and Company, Wilmington, Delaware, under the trademark "Mylar" or the like, which prevents the same from becoming welded to the die wall.

After the positioning of the thus assembled fuel tube within the body 10 of the die, as indicated in FIGURE 1, the end caps 15 are positioned with their projections 19 bearing against the washers 14 and the screws 17 and nuts 18 are adjusted to draw the end members 15 toward each other and compress the gaskets 13 against the edges of the inner cladding 32, as indicated in FIGURE 2. Actuation of the vacuum pump 24 creates a vacuum in line 23 so as to evacuate air from the passage 22 and prevent the formation of air bubbles as the cladding and fuel bearing tubes are forced rapidly together against the die wall 11. The explosive cord 20 is then positioned interiorly of the thus assembled fuel tube and die, in the manner illustrated in FIGURE 1, and the device then submerged and immersed in water 35 in a tank 36 or the like and exploded by means of the detonator 26, the switch 29 connecting the detonator with its source of electrical energy 28 for such purpose. The resulting explosion will cause a hydraulic shock wave through the water in the bore 11 to drive the three components 30, 31 and 32 or, in the preferred form, the four components 30, 31, 32 and 33, to make a metallurgical bond. It will, of course, be understood that instead of the water 35 being used as the medium for carrying the shock waves of the explosion, it is contemplated that other fluids and/ or inert powders may be utilized for such purpose. It will also be apparent that the provision of the filler members 33 enables the completed tubes to be supported at their end portions where there is no fuel lamina, thus providing a more rigid structure at such end portions in the completed tubes.

In the modification illustrated in FIGURES 4 and 5, a male explosive bonding die has a cylindrical body 50 centrally drilled and tapped in each end portion thereof to threadably receive threaded rods 51, each of which extends through a centrally disposed opening in an antideformation cap 52. Each cap 52 is provided at its outer end portion with a nut 53, a washer 54 being interposed between each of the nuts 53 and its associated member 52. A rubber gasket 55 is positioned against each end of the body 50 and each of the gaskets 55 has mounted against its outer face a sealing washer 56, it being apparent that the gaskets 55 and washers 56 are interposed between the body 50 and the adjacent cap 52.

One of the caps 52 has mounted therein one end of a tube 57, the inner end of which communicates with a passage 58 having its inner end in communication with an opening 59 in the adjacent washer 56 and with an opening 60 in the gasket 55 lying adjacent thereto.

The cylindrical body 50 is first coated, as indicated at 61, with barrier material after which an inner cladding tube 62, a tube or cylinder of fuel material 63 and an outer cladding tube or cylinder 64 are placed thereover. If desired, end filler members 65 may be used in the manner above described with the preferred form of FIGURES 1 to 3.

As indicated in FIGURE 5, the overall length of the various components of the fuel tube are slightly greater than the length of the body 50. A fitting 66 is provided at the outer end of the tube 57 for connection to a source of vacuum, not shown, but which will approximate that employed with the preferred form.

In operation, it will be apparent that when vacuum is applied through the fitting 66 and pipe 57 to passageway 58, that the air will be removed from the assembled elements of the fuel tube. The assembled parts of the fuel tube having previously been wrapped with sheet explosive 67, the entire device may now be lowered into water, as previously described with reference to the method and apparatus of FIGURES 1 to 3, inclusive, and the sheet explosive 67 then detonated. It will be apparent that the various elements of the fuel tube will be imploded thus driving the components of the fuel tube together forming a metallurgical bond.

While only certain forms of the invention have been shown and described herein, it will be readily apparent to those skilled in the art that many changes and modifications may be made without departing from the scope and spirit of the appended claims.

What is claimed is:

1. The method of bonding a plurality of metal laminae comprising first assembling said laminae in surface-to-surface adjacency upon a die face, next evacuating air from the spaces between said laminae, next immersing the said die and laminae in a fluid, and finally detonating an explosive outwardly of said laminae with respect to said die face.

2. The method of bonding a plurality of metal laminae comprising first assembling said laminae in surface-to-surface adjacency upon a die face, next evacuating air from the spaces between said laminae, next immersing the said die and laminae in water, and finally detonating an explosive outwardly of said laminae with respect to said die face.

3. The method of bonding a plurality of concentric closely positioned metallic cylinders comprising first placing said cylinders in a closely fitting cylindrical bore of a die body, next immersing the assembled cylinders and die in a fluid, and finally detonating an explosive within the innermost cylinder.

4. The method of claim 3 wherein the bore of said die is first coated with a barrier material whereby the said metallic cylinders are isolated from the bore so as to prevent bonding therewith during the detonation of said explosive.

5. The method of bonding a plurality of concentric closely positioned metallic cylinders comprising first placing said cylinders in a closely fitting cylindrical bore of a die body, next placing sealing gaskets to overlie the ends of the innermost cylinder and the adjacent end of said die body, next evacuating the space defined by said gaskets, said die bore and the innermost cylinder, next placing said assembled cylinders and die in a fluid, and finally detonating an explosive within the innermost cylinder.

6. The method of claim 5 wherein the bore of the die is first coated with a barrier material whereby the said metallic cylinders are isolated from the bore so as to prevent bonding therewith during the detonation of said explosive.

7. The method of bonding a plurality of closely positioned metallic cylinders comprising first placing said cylinders in closely fitting relationship upon a cylindrical die body, next wrapping sheet explosive upon the outermost cylinder, next placing said assembled elements in a fluid, and finally detonating said explosive.

8. The method of claim 7 wherein the said die body is first coated with a barrier material whereby the said metallic cylinders are isolated from the die body so as to prevent bonding therewith during the detonation of said explosive.

9. The method of bonding a plurality of closely positioned metallic cylinders comprising first placing said cylinders in closely fitting relationship upon a cylindrical die body, next wrapping sheet explosive upon the outermost cylinder, next placing gaskets at both ends of said die in pressure contact with said die and the adjacent cylinders and explosive sheet, next evacuating the space defined by said gaskets, said die and said sheet, next placing the assembled elements in a fluid, and finally detonating said sheet.

10. The method of claim 9 wherein the die body is first coated with a barrier material whereby the said metallic cylinders are isolated from the die body so as to prevent bonding therewith during the detonation of said explosive.

11. The method of making fuel tubes for nuclear reactors comprising the assembling in closely aligned concentric relation and outer metallic cladding cylinder, an inner metallic cladding cylinder, and a lamina of fuel-bearing core material between said cladding cylinders, next placing said assembled cylinders in a closely fitting cylindrical bore of a die body, next positioning an explosive within the inner cladding cylinder, next immersing the thus assembled elements in a fluid, and finally detonating said explosive.

12. The method of claim 11 wherein the bore of said die body is first coated with a barrier material whereby the said outer cladding cylinder is isolated from the bore so as to prevent bonding therewith during the detonation of said explosive.

13. The method of making fuel tubes for nuclear reactors comprising the assembly in closely aligned concentric relation of an outer metallic cladding cylinder, an inner metallic cladding cylinder, a foreshortened cylindrical insert between each of the outer end portions of said inner and outer cylinders and a lamina of fuel-bearing core material in the space between said inner and outer cylinders and said inserts, next placing said assembled cylinders and inserts in a closely fitting cylindrical bore of a die body, next positioning an explosive within the inner cladding cylinder, next immersing the thus assembled elements in a fluid, and finally detonating said explosive.

14. The method of claim 13 wherein the bore of said die body is first coated with a barrier material whereby the said outer cladding cylinder is isolated from the bore so as to prevent bonding therewith during the detonation of said explosive.

15. The method of making fuel tubes for nuclear reactors comprising the assembly in closed aligned concentric relation of an outer metallic cladding cylinder, an inner metallic cladding cylinder, a foreshortened cylindrical insert between each of the outer end portions of said inner and outer cylinders and a lamina of fuel-bearing core material in the space between said inner and outer cylinders and said inserts, next placing said assembled cylinders and inserts in a closely fitting cylindrical bore of a die body, next placing sealing gaskets to overlie the ends of the innermost cylinder and the adjacent end of said die body, next evacuating the space defined by said gaskets, said die bore and the innermost cylinder, next positioning an explosive within the inner cladding cylinder, next immersing the thus assembled elements in a fluid, and finally detonating said explosive.

16. The method of claim 15 wherein the bore of said die body is first coated with a barrier material whereby the said outer cladding cylinder is isolated from the bore so as to prevent bonding therewith during the detonation of said explosive.

17. The method of making fuel tubes for nuclear reactors comprising the assembly in closely aligned concentric relation of an outer metallic cladding cylinder, an inner metallic cladding cylinder, a foreshortened cylindrical insert between each of the outer end portions of said inner and outer cylinders and a lamina of fuel-bearing core material in the space between said inner and outer cylinders and said inserts, next placing said assembled cylinders and inserts in closely fitting relation upon a die body, next wrapping sheet explosive upon the outermost cylinder, next placing gaskets at both ends of said die in pressure contact with said die and the adjacent cylinders and explosive sheet, next evacuating the space defined by said gaskets, said die and said sheet, next placing the thus assembled elements in a fluid, and finally detonating said sheet.

18. The method of claim 17 wherein said die body is first coated with a barrier material whereby the said inner cladding cylinder is isolated from the die body so as to prevent bonding therewith during the detonation of said explosive.

19. A die for bonding a plurality of concentric closely aligned metallic cylinders comprising a cylindrical die body having a centrally disposed longitudinally extending bore therein for receiving said cylinders, said body having a centrally disposed circular recess in each end thereof, said recesses being of greater diameter than that of said bore, a circular end plate positioned at each end of said body and being of substantially greater diameter than that of said bore, a circular end plate positioned at each end of said body and being of substantially greater diameter than that of said body, a circular abutment formed on the inner side of each plate and extending into the adjacent body recess, said abutments and their adjacent plate portions each being provided with a central aperture, gasket means interposed between the inner face of each abutment and the inner face of its associated recess, a plurality of circumferentially spaced clamp rods interconnecting the peripheral portions of said plates exteriorly of said body, and a pipe fitting mounted in the outer side of said body adjacent one end thereof, said body having a radial passageway interconnecting said fitting and said bore.

20. A die for bonding a plurality of concentric closely positioned metallic cylinders comprising a solid cylindrical body, and apertured circular end cap at each end of said body, a threaded opening centrally positioned in each end of said body, a threaded rod threadably engaged in each opening and extending freely through its associated cap, a nut threaded on each rod exteriorly of its associated cap, gasket means interposed between each cap and the body, said caps and said gasket means extending radially outwardly to a greater diameter than that of said body, and a pipe extending from one of said caps, said last-mentioned cap having a passageway interconnecting said pipe and the peripheral portion of said cap overlying the adjacent body portion.

References Cited by the Examiner
UNITED STATES PATENTS

| 2,367,206 | 1/45 | Davis | 29—421 |
| 2,648,125 | 8/53 | McKenna et al. | 29—421 |
| 2,961,357 | 11/60 | Earnhardt | 29—421 |
| 3,004,907 | 10/61 | Precht et al. | |

OTHER REFERENCES

"American Machinist," vol. 103, No. 12, June 15, 1959, pages 127, 132–138.

High-Energy-Rate Metalworking Today, "The Tool and Manufacturing Engineer," January 1962, pp. 61–66.

"Steel," Aug. 25, 1958, pp. 82–85.

Zernow: "The Tool and Manufacturing Engineer," vol. 41, No. 1, July 1961, pp. 75–78.

CARL D. QUARFORTH, *Primary Examiner.*

OSCAR R. VERTIZ, *Examiner.*